United States Patent [19]

Barabas et al.

[11] 4,301,267

[45] Nov. 17, 1981

[54] ULTRAVIOLET LIGHT STABLE COPOLYMER COMPOSITIONS COMPRISING MONOMERS WHICH ARE $\alpha,\beta$-UNSATURATED DICARBOXYLIC ACID HALF-ESTERS OF 2-HYDROXY, ALKOXY, METHYLOLBENZOPHENONES AND STYRENE-BUTADIENE COMONOMERS

[75] Inventors: Eugene S. Barabas, Watchung; Prakash Mallya, Bloomingdale; Stanley J. Gromelski, Jr., West Caldwell, all of N.J.

[73] Assignee: GAF Corporation, New York, N.Y.

[21] Appl. No.: 181,336

[22] Filed: Aug. 26, 1980

[51] Int. Cl.$^3$ .............................................. C08F 20/20
[52] U.S. Cl. ............................. 526/313; 260/45.85 P; 560/221
[58] Field of Search .................. 526/313, 318, 316; 560/221, 209; 260/45.85 P, 45.95 F

[56] References Cited

U.S. PATENT DOCUMENTS

| | | | |
|---|---|---|---|
| 3,162,676 | 12/1964 | Goldberg et al. | 526/313 |
| 3,165,497 | 1/1965 | Tocker | 526/313 |
| 3,328,491 | 6/1967 | Fertig et al. | 526/313 |
| 3,365,421 | 1/1968 | Horton et al. | 526/313 |
| 4,177,122 | 12/1979 | Sato | 204/159.16 |
| 4,186,151 | 1/1980 | Kubota et al. | 260/591 |

Primary Examiner—Paul R. Michl
Attorney, Agent, or Firm—James Magee, Jr.; Walter Katz

[57] ABSTRACT

This invention relates to ultraviolet light stable copolymer compositions comprising:

(a) a monomer which is an $\alpha,\beta$-unsaturated dicarboxylic half-ester of a 2-hydroxy, alkoxy, methylolbenzophenone, and, (b) a comonomer which is styrene or styrene-butadiene, is described.

10 Claims, No Drawings

ULTRAVIOLET LIGHT STABLE COPOLYMER COMPOSITIONS COMPRISING MONOMERS WHICH ARE α,β-UNSATURATED DICARBOXYLIC ACID HALF-ESTERS OF 2-HYDROXY, ALKOXY, METHYLOLBENZOPHENONES AND STYRENE-BUTADIENE COMONOMERS

BACKGROUND OF THE INVENTION

1. Field of the Invention

This invention relates to ultraviolet light stable copolymers, and, more particularly, to a composition of a monomer which is an α,β-unsaturated dicarboxylic acid half-ester of 2-hydroxy, alkoxy, methylolbenzophenone, and a styrene or styrene-butadiene comonomer.

2. Description of the Prior Art

Hydroxy, alkoxybenzophenone compounds are known to be effective ultraviolet light absorbers and stabilizers. For example, in U.S. Pat. No. 4,186,151, there is disclosed in detail literature and patent references relating to such compounds and derivatives thereof. Additionally, in U.S. Pat. No. 4,177,122 there is described the preparation of ultraviolet light sensitive compounds obtained by reacting a hydroxybenzophenone with an alkylene oxide and esterifying with an unsaturated end group, which are useful particularly in making printing inks.

CROSS-REFERENCE TO RELATED APPLICATIONS

Ser. No. 168,224, filed July 10, 1980, by the same inventors and assigned to the same assignee as herein, describes and claims copolymerizable ultraviolet light absorber monomers which are α,β-unsaturated dicarboxylic acid half-esters of 2-hydroxy, alkoxy, methylolbenzophenones.

Ser. No. 153,107, filed May 23, 1980, by the same inventors and assigned to the same assignee as herein, describes and claims intermediate methylol compounds used herein.

Ser. No. 168,223, filed July 10, 1980, by the same inventors and assigned to the same assignee as herein, describes and claims copolymerizable ultraviolet light acrylic ester absorber monomers.

SUMMARY OF THE INVENTION

In accordance with the invention, there is provided herein ultraviolet light stable copolymer compositions which comprise (a) a monomer which is an α,β-unsaturated dicarboxylic acid half-ester of a 2-hydroxy, alkoxy, methylolbenzophenone, said compound having the formula:

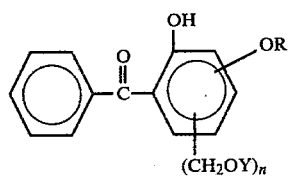

where
R is alkyl $C_1$–$C_8$, and
n is 1 or 2, and
Y is a half-acyl radical of an α,β-dicarboxylic acid selected from maleic and itaconic acids, and (b) styrene or styrene-butadiene comonomer.

In the preferred embodiments of the invention, the —OR group is methoxy in the 4-position, —CH$_2$OY is located at the 3- or 5- positions of the phenyl ring, Y is derived from maleic anhydride, and n is 1.

The monomer is made by monoesterifying intermediate compounds, prepared by converting a 2-hydroxy, alkoxy, benzophenone to the corresponding methylol derivative by a formylation reaction, with the desired acid anhydride.

DETAILED DESCRIPTION OF THE INVENTION

The intermediate compounds used in making the monomers of the invention are obtained by formylation of a 2-hydroxy, alkoxybenzophenone starting material having the formula:

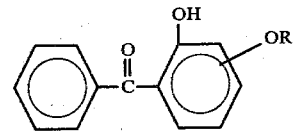

where R is alkyl $C_1$–$C_8$, with formaldehyde in aqueous alkaline solution at a pH of about 12–13, and at a temperature of less than 40° C., preferably at room temperature, using a water-miscible organic solvent to keep the benzophenone in solution.

An alkyl group is defined herein as being either straight chain or branched, including methyl, ethyl, propyl, butyl, octyl, isopropyl, isobutyl and the like.

During the formylation reaction, an excess of formaldehyde in the reaction mixture prevents side reactions from occurring, thus increasing the yield of the desired methylol product. Accordingly, when the molar ratio of benzophenone to formaldehyde is adjusted to 1:1, a yield of about 70% of predominately the 5-monomethylol intermediate is obtained during a 24-hour reaction period. On the other hand, by using a ratio with an excess of formaldehyde, e.g., about 1:3, the yield of methylol compounds is about 95%. The product is a mixture of the 5- and 3-monomethylol compounds, in about a 60:40 ratio of each, and some 3,5-dimethylol compound, during a 5½ hour reaction period. Still higher ratios may be used, too, but the substantial excess of formaldehyde must be separated from the reaction products, which is undesirable.

The concentration of the reactants is not critical. Generally they are made low enough to keep them in solution but sufficiently high to enable the reaction to proceed at a reasonable reaction rate. Usually the benzophenone is present at a concentration of about 30% by weight, and the formaldehyde about 10% by weight of the solution. The alkali is present at a concentration of about 10%.

After the methylol intermediate is formed, the reaction product mixture is acidified and washed with water. Then unreacted formaldehyde, which is present in the organic phase, is removed under vacuum. The resultant oily organic product is dried overnight over molecular sieves to remove residual traces of water.

The intermediate product may be isolated as an individual compound or compounds, or kept as a mixture of several compounds. Either form may be immediately converted to the desired monomer by monoesterification with an α,β-unsaturated carboxylic acid anhydride, such as maleic or itaconic anhydrides.

The presence of the primary methylol group on the phenyl ring of the benzophenone intermediate enables the preparation of the monoester monomers with relative ease. The monomers are characterized by nuclear magnetic resonance ($^1H$, $^{13}C$), infra-red and ultraviolet spectroscopy.

The product then is copolymerized with various comonomers which form free radicals reactive with the double bond of the compounds of the invention. Preferred comonomers include styrene, styrene-butadiene, and the like. The copolymers of the invention have built-in ultraviolet light stability. Such polymerizations may be carried out under conventional emulsion, suspension or solution copolymerization conditions.

The monomer and comonomer may be combined in any desired amounts. Usually, however, the monomer is present in an amount of about 0.1 to 15%, and the comonomer about 99.9 to 15% by weight of the composition; preferably, about 0.2 to 2%, and 99.8 to 98% respectively.

The following non-limiting examples will illustrate the invention more particularly.

EXAMPLE 1

Preparation of 2-Hydroxy, Alkoxy, Methylolbenzophenone Maleate Half-Ester

A. 2-Hydroxy, Alkoxy, Methylolbenzophenone

Into a 100 ml. 3-necked flask equipped with thermometer, dropping funnel and magnetic stirrer is charged 2-hydroxy-4-methoxybenzophenone (65.2 g., 0.286 moles) dissolved in 11.44 g. of sodium hydroxide in 115 g. of distilled water, and 64 ml. of tetrahydrofuran is added to produce a clear solution. The 27% solution of formaldehyde (64.0 g., 0.789 moles) is added with stirring at room temperature and the reaction is allowed to proceed for 5½ hours. Thereafter the reaction product mixture is acidified to a pH of 5-6, using a 50% acetic acid solution, and washed several times with distilled water. Then the unreacted formaldehyde present in the organic phase is removed by rotating the mixture on a Rotovac in vacuum. The organic phase is dried overnight over molecular sieves. The yield is 60.0 g. of a mixture of the desired intermediate products which may be used as such for the subsequent esterification reaction with the unsaturated anhydride or acid halide. The 5-methylol intermediate is about 58 parts, the 3-methylol intermediate about 38 parts and the 3,5-dimethylol intermediate about 4 parts of the mixture.

B. The reaction product of A (40 g.,) is dissolved in a solution of maleic anhydride (15.4 g., 0.157 moles) in 25 ml. of anhydrous methylethylketone. The resulting solution then is heated to 35° C., and held there for 10 hours, whereupon 25 ml. of methyl butyl ketone is added. The solution is washed with water, dilute sodium carbonate solution again several times with water, and finally the desired monomer product is dried over molecular sieves.

EXAMPLE 2

Preparation of 2-Hydroxy-4-Alkoxy-5-Methylolbenzophenone Maleate Half-Ester

The procedure of Example 1A is repeated using 2-hydroxy-4-methoxybenzophenone (65.2 g., 0.286 moles) and 37% formaldehyde (23.2 g., 0.286 moles), for 24 hours. The methylol product is predominately the 5-methylol intermediate, 55.4 g., obtained in a yield of 75%. The procedure of Example 1B then is repeated to provide the desired monomer.

EXAMPLE 3

Preparation of 2-Hydroxy, Alkoxy, Methylolbenzophenone Itaconate Half-Ester

The procedure of Example 1 is repeated with itaconic anhydride to provide the desired monomer.

EXAMPLE 4

Preparation of 2Hydroxy-4-Alkoxy-5-Methylolbenzophenone Itaconate Half-Ester

The procedure of Example 2 is repeated with itaconic anhydride to provide the desired monomer.

EXAMPLE 5

Preparation of Copolymers

The monomer of Example 1 is copolymerized with styrene under emulsion polymerization conditions to provide a useful copolymer having enhanced, built-in ultraviolet light stability.

The following materials are used.

| No. | Ingredient | Amount (g.) |
|---|---|---|
| 1 | Distilled water | 322.0 |
| 2 | Siponate DS-10 - Surfactant | 6.0 |
| 3 | Styrene | 47.66 |
| 4 | 2-Hydroxy, alkoxy, methylolbenzophenone maleate half-ester | 8.1 |
| 5 | Ammonium persulfate (in 10.0 g. distilled water) | 1.5 |
| 6 | Styrene | 181.2 |

Ingredient No. 2 is dissolved in No. 1 and the solution is charged into a 1 l. kettle. Then No. 4 in No. 3 is added with stirring. The contents are alternatively evacuated and purged with $N_2$ three times. Then the contents are heated to 75° C. while stirring is continued. At 75° C., No. 5 is added; then No. 6 is charged during a period of 1 hour. The reaction mixture then is held at 75°±2° C. for 4½ hours, cooled to room temperature and discharged. The resulting latex is coagulated and the copolymer obtained is purified by exhaustive extraction with acetone using a Soxhlet extractor. The presence of the comonomer as a part of the polymer is identified by ultraviolet spectroscopy.

Stability of the copolymer to ultraviolet light is determined by comparing films of the copolymer with films of polystyrene, the latter being synthesized in a similar manner as the copolymer but without using comonomer No. 4. A standard Weatherometer test for 100 hours is used (carbon arc, 40° dry). The test results show that the polymer containing the comonomer changes only very slightly in appearance whereas the polystyrene is noticeably yellowed.

EXAMPLE 6

The monomer of Example 1 is copolymerized with styrene and butadiene under emulsion polymerization conditions to provide another useful copolymer which also has enhanced, built-in ultraviolet light stability. The following materials are used:

| No. | Ingredient | Amount (g.) |
|---|---|---|
| 1 | Distilled water | 935.1 |
| 2 | Kemplex-- 100 (42%) | 2.2 |
| 3 | Monawet MB - 45 (45%) | 10.66 |
| 4 | Seed latex (42%) | 57.10 |
| 5 | 2-Hydroxy, alkoxy, methylolbenzophenone maleate half-ester | 24.30 |
| 6 | Itaconic acid | 18.0 |
| 7 | Distilled water | 50.0 |
| 8 | Ammonium persulfate | 2.4 |
| 9 | Styrene | 684.0 |
| 10 | Butadiene | 480.0 |
| 11 | t-Dodecyl mercaptan | 4.8 |
| 12 | Distilled water | 200.0 |
| 13 | Sodium hydroxide (20%) | 18.0 |
| 14 | Ammonium persulfate | 6.0 |
| 15 | Monawet MB-45 (45%) | 21.3 |

What is claimed is:

1. An ultraviolet light stable copolymer composition comprising:

(a) a monomer which is an $\alpha,\beta$-unsaturated dicarboxylic acid half-ester of a 2-hydroxy, alkoxy, methylolbenzophenone, having the formula:

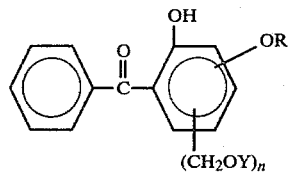

where

R is alkyl $C_1$–$C_8$, n is 1 or 2, and

Y is a half-acyl radical derived from maleic or itaconic anhydrides, and, (b) a comonomer selected from styrene and styrene-butadiene.

2. A copolymer composition according to claim 1 in which the monomer is the $\alpha,\beta$-unsaturated dicarboxylic acid half-ester of 2-hydroxy-4-alkoxy-5-methylolbenzophenone having the formula:

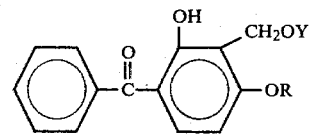

where R and Y are as defined in claim 1.

3. A copolymer composition according to claim 1 in which the monomer is the $\alpha,\beta$-unsaturated dicarboxylic acid half-ester of 2-hydroxy-3-methylol-4-alkoxybenzophenone having the formula:

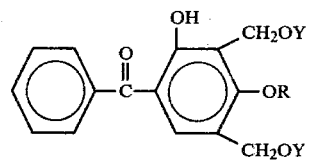

where R and Y are as defined in claim 1.

4. A copolymer composition according to claim 1 in which the monomer is the $\alpha,\beta$-unsaturated dicarboxylic acid half-ester of 2-hydroxy-3,5-dimethylol-4-alkoxybenzophenone, having the formula:

where R and Y are as defined in claim 1.

5. A copolymer composition according to claims 1, 2, 3 or 4 in which R is $C_1$–$C_3$.

6. A copolymer composition according to claim 2 in which the monomer is 2-hydroxy-4-methoxy-5-methylolbenzophenone maleate half-ester.

7. A copolymer composition according to claim 3 in which the monomer is 2-hydroxy-3-methylol-4-methoxybenzophenone maleate half-ester.

8. A copolymer composition according to claim 4 in which the monomer is 2-hydroxy-3,5-dimethylol-4-methoxybenzophenone maleate half-ester.

9. A copolymer composition comprising a mixture of the monomers of claims 2, 3 or 4 and styrene or styrene-butadiene comonomer.

10. A copolymer composition according to claim 9 which is comprised essentially of the monomers of claims 2 and 3 and styrene or styrene-butadiene comonomer.